(12) United States Patent
Li et al.

(10) Patent No.: US 9,723,342 B2
(45) Date of Patent: Aug. 1, 2017

(54) METHOD AND APPARATUS FOR LOW JITTER CLOCK RECOVERY IN WIRELESS DISPLAY EXTENSIONS

(75) Inventors: Guoqing Li, Portland, OR (US); Joseph A. Bennett, Roseville, CA (US); Gideon Prat, Haifa (IL); Solomon B. Trainin, Haifa (IL); Sang-Hee Lee, Santa Clara, CA (US); Vallabhajosyula Z. Somayazulu, Portland, OR (US); George R. Hayek, El Dorado Hills, CA (US); Pat Brouillette, Tempe, AZ (US); Dmitrii A. Loukianov, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 43 days.

(21) Appl. No.: 13/996,621

(22) PCT Filed: Dec. 21, 2011

(86) PCT No.: PCT/US2011/066404
§ 371 (c)(1),
(2), (4) Date: Jul. 6, 2015

(87) PCT Pub. No.: WO2013/095417
PCT Pub. Date: Jun. 27, 2013

(65) Prior Publication Data
US 2015/0382035 A1    Dec. 31, 2015

(51) Int. Cl.
*H04N 21/242* (2011.01)
*H04N 21/236* (2011.01)
(Continued)

(52) U.S. Cl.
CPC ..... *H04N 21/242* (2013.01); *H04N 21/23608* (2013.01); *H04N 21/4305* (2013.01); *H04N 21/6131* (2013.01)

(58) Field of Classification Search
CPC ........... H04N 21/242; H04N 21/23608; H04N 21/4305; H04N 21/6131
See application file for complete search history.

(56) References Cited

U.S. PATENT DOCUMENTS

| | | | |
|---|---|---|---|
| 5,467,342 A | 11/1995 | Logston et al. | |
| 6,449,352 B1 | 9/2002 | Takahashi et al. | |

(Continued)

FOREIGN PATENT DOCUMENTS

WO    2013/095417 A1    6/2013

OTHER PUBLICATIONS

International Preliminary Report on Patentability and Written Opinion received for PCT Patent Application No. PCT/US2011/066404, mailed on Jul. 3, 2014, 6 pages.
(Continued)

*Primary Examiner* — Nathan Flynn
*Assistant Examiner* — Christine Kurien
(74) *Attorney, Agent, or Firm* — Patent Capital Group

(57) ABSTRACT

An approach is provided for determining a program clock reference (PCR) value validity, for avoiding inaccurate variable delay reference (VDR) values, and for avoiding a mismatch in a data packet between a sequence number and a packet number for a wireless display extension. The approach involves determining to generate a data packet carrier having an optional PCR value, a VDR) value, and a validity indicator. The approach may further involve processing the data packet carrier to determine whether the data packet carrier has the optional PCR value. The approach may also involve causing, at least in part, a surrogate PCR value to be generated based, at least in part, on a determined absence of the optional PCR value from the data packet carrier.

15 Claims, 5 Drawing Sheets

(51) Int. Cl.
*H04N 21/61* (2011.01)
*H04N 21/43* (2011.01)

(56) References Cited

U.S. PATENT DOCUMENTS

| | | |
|---|---|---|
| 7,746,870 B2 | 6/2010 | Eyer |
| 2001/0024456 A1* | 9/2001 | Zaun ........................ H04N 7/24 |
| | | 370/535 |
| 2002/0018645 A1* | 2/2002 | Nakamatsu .......... G11B 27/036 |
| | | 386/278 |
| 2010/0118934 A1 | 5/2010 | Kim et al. |

OTHER PUBLICATIONS

International Search Report and Written Opinion received for PCT Patent Application No. PCT/US2011/066404, mailed on Sep. 24, 2012, 9 pages.

* cited by examiner

# METHOD AND APPARATUS FOR LOW JITTER CLOCK RECOVERY IN WIRELESS DISPLAY EXTENSIONS

BACKGROUND

Service providers and device manufacturers (e.g., wireless, cellular, etc.) are continually challenged to deliver value and convenience to consumers by, for example, providing compelling network services. One area of interest involves system performance in 60 GHz communication systems. According to current 60 GHz communication standards such as the Wireless Gigabit Alliance (WiGig), a data packet format that is communicated between at least two devices has information such as a program number, a sequence number, program clock reference (PCR) value, variable delay reference (VDR) value and a flag. WiGig requires that each data packet carries a PCR value that contains a timestamp (i.e., counter value) corresponding to a 27 MHz video clock. According to some implementations, this video clock resides in a graphics processing unit (GPU) and the PCR value is generated by the GPU by way of a display engine. The data packet also contains a VDR value which captures the delay variation for each packet. The VDR is the variable queuing time for each data packet.

Conventionally, the VDR value is determined based on the PCR value. There may be instances where the PCR value is inaccurate for example due to the fact that the display engine cannot generate accurate PCR value fast enough for every packet since the processing load is too high. The inaccurate PCR value, in turn, results in an inaccurate VDR value. An inaccurate VDR value often results in increased clock jitter and increased clock acquisition time at the receiver, which leads to an unsatisfactory user experience.

In addition, a packet may be retransmitted in wireless link and there are two possibilities to handle the VDR value when retransmission happens. If the VDR is not re-calculated, then the VDR value becomes inaccurate. An inaccurate VDR value results in increased clock jitter and increased clock acquisition time at the receiver, which leads to unsatisfactory user experience. If VDR value is re-calculated when retransmission happens, it results in a mismatch between the sequence number value and the packet number value from the encryption process. As such, the data packet will be dropped at a receiver side of a radio communication because of this mismatch. This dropping degrades the performance of the delivered service.

SOME EXAMPLE EMBODIMENTS

Therefore, there is a need for an approach for determining PCR and VDR value validity, for avoiding inaccurate PCR and VDR values, and for avoiding a mismatch in a data packet between a sequence number and a packet number for a wireless display extension.

According to one embodiment, a method comprises determining to generate a data packet carrier comprising an optional PCR value, a VDR value, and a validity indicator.

According to another embodiment, an apparatus comprises at least one processor, and at least one memory including computer program code for one or more computer programs, the at least one memory and the computer program code configured to, with the at least one processor, cause, at least in part, the apparatus to determine to generate a data packet carrier comprising an optional PCR value, a VDR value, and a validity indicator.

According to another embodiment, a computer-readable storage medium carries one or more sequences of one or more instructions which, when executed by one or more processors, cause, at least in part, an apparatus to determine to generate a data packet carrier comprising an optional PCR value, a VDR value, and a validity indicator.

Exemplary embodiments are described herein. It is envisioned, however, that any system that incorporates features of any apparatus, method and/or system described herein are encompassed by the scope and spirit of the exemplary embodiments.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for determining a program clock reference (PCR) value validity, for avoiding inaccurate variable delay reference (VDR) values, and for avoiding a mismatch in a data packet between a sequence number and a packet number for a wireless display extension are disclosed. In the following description, for the purposes of explanation, numerous specific details are set forth in order to provide a thorough understanding of the discussed embodiments. It is apparent, however, to one skilled in the art that the embodiments of the invention may be practiced without these specific details or with an equivalent arrangement. In other instances, well-known structures and devices are shown in block diagram form in order to avoid unnecessarily obscuring the discussed embodiments.

Figure 1:
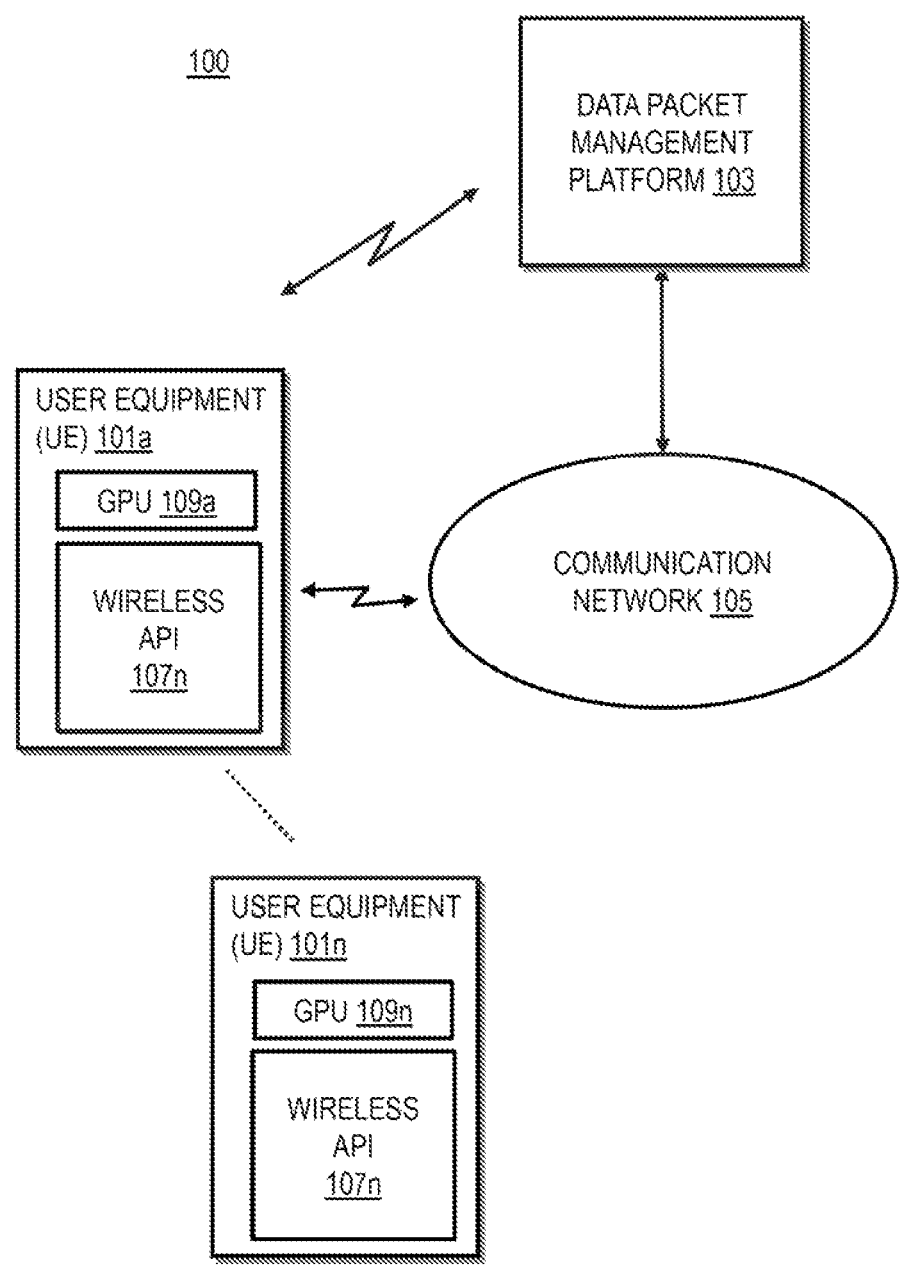
FIG. 1 is a diagram of a system capable of determining a PCR value validity, for avoiding inaccurate VDR values, and for avoiding a mismatch in a data packet between a sequence number and a packet number for a wireless display extension, according to one embodiment.

FIG. 1 is a diagram of a system 100 capable of determining a PCR value validity, for avoiding inaccurate VDR values, and for avoiding a mismatch in a data packet between a sequence number and a packet number for a wireless display extension, according to one embodiment.

The Wireless Gigabit Alliance (WiGig) version 1.0 specification, published July 2010, and beyond allows devices to communicate without wires at multi-gigabit speeds. For example, the WiGig specification supports data transmission rates up to 7 Gbps which is more than 10 times faster than the highest conventional 802.11n rate. The WiGig specification supplements and extends the 802.11 Media Access Control (MAC) layer and is backward compatible with the IEEE 802.11 standard, published Jun. 12, 2007, and beyond. WiGig tri-band enabled devices, for example, which operate in the 2.4, 5 and 60 GHz bands, are capable of delivering data transfer rates up to 7 Gbit/s.

A physical layer (PHY) in the WiGig specification enables both low power and high performance WiGig devices, and guarantees interoperability and communication at gigabit rates. The WiGig specification enables high performance wireless data, display and audio applications that supplement the capabilities of today's wireless LAN devices.

According to current 60 GHz communication standards such as WiGig, a data packet format that is communicated between at least two devices has information such as a program number, a sequence number, a PCR value, a VDR value, and a flag. WiGig requires that each data packet carries a PCR value that contains a timestamp (i.e., counter value) corresponding to a 27 MHz video clock. According to some implementations, this video clock resides in a graphics processing unit (GPU) and the PCR value is generated by the GPU by way of a visual and parallel group (VPG).

The data packet also contains a VDR value that captures the delay variation for each data packet. The VDR is the variable queuing time for each packet.

Conventionally, the VDR value is determined based on the PCR value. There may be instances where the PCR value is invalid because it is either expired or generated based on an inaccurate estimate. The expired or inaccurate PCR value, in turn, results in an inaccurate VDR value. An inaccurate VDR value often results in a data packet mismatch between the sequence number value and the packet number value. As such, the data packet will be dropped at a receiver side of a radio communication because of this mismatch. This dropping causes jitter in a wireless communication that is in accordance with, for example, a wireless display extension (WDE).

To avoid an expired PCR value, the PCR value (and the VDR value because it is based on the PCR value) could be generated with every data packet. However, there problems with generating the PCR value and the VDR value in every packet according to the current WDE data format.

For example, some implementations of a GPU may operate with a power saving mode. When a WDE packetization engine that corresponds with the GPU wakes up, in order to be compliant with the PCR generation rule (i.e. to generate a PCR value in every data packet), the WDE packetization engine needs to predict/calculate the PCR value for each data packet assuming that the GPU had been running continuously. Such calculation/prediction is an estimation that involves calculations using multiplication and division, for example. These calculations often cause imprecision that may result in an accumulation of errors to a point that the PCR value is invalid. Additionally, many GPU's are not equipped with such calculation logic.

Also, the generation of the VDR value is conventionally done at a the MAC/PHY layer. Generation of the VDR value, because it is based on the PCR values, relies on an accurate PCR value for proper operation. Thus, when the PCR value becomes inaccurate because of an inaccurate estimate, for example, the VDR value is also not accurate anymore.

Further, the VDR value is generated when the data packet is about to leave a MAC queue. Then, during retransmission, the VDR value is re-calculated, re-inserted and the packet has to be re-encrypted at the time it is to be communicated. The re-encryption produces a mismatch between the sequence number (generated when the data packet arrives at the MAC layer) and the packet number (when the data packet is encrypted). As such, the data packet will be dropped at a receiver side of a communication because of this mismatch.

To address this problem, a system 100 of FIG. 1 introduces the capability to determine a PCR value validity, for avoiding inaccurate VDR values, and for avoiding a mismatch in a data packet between a sequence number and a packet number for a wireless display extension.

As shown in FIG. 1, the system 100 comprises one or more user equipment (UE) 101a-101n (hereinafter collectively referred to as UE 101) having connectivity to a data packet management platform 103 which may be onboard the UE 101 or connected via a communication network 105. The UE 101 may also comprise one or more wireless application programming interface (API) 107a-107n (hereinafter collectively referred to as wireless API 107) that may be a means for the UE 101 to communicate with other devices or UE 101's over the communication network 105, directly or indirectly by way of a communication means conforming to the WiGig 60 GHz standard discussed above, any other radio standard, or by way of the communication network 105, for example. The UE 101 may also comprise a GPU 109a-109n (hereinafter collectively referred to as GPU 109).

According to various embodiments, the system 100 reduces or eliminates jitter in a communication by determining a PCR value validity, avoiding inaccurate VDR values, and avoiding a mismatch in a data packet between a sequence number and a packet number for a wireless display extension.

In one embodiment, the system 100 is configured to add an indication in a packet header of the data packet to indicate the whether one or both of the PCR and VDR fields are valid. As discussed above, a GPU 109 may not generate an exact PCR value because the GPU 109 was in a sleep mode, and upon entering a wake mode, the GPU 109 will estimate a PCR value based on predicted information generated as if the GPU 109 had been in a wake mode. Errors may be introduced into the system 100 that may cause a data mismatch and a communication to improperly operate causing jitter. But, if an estimated PCR value is flagged as being invalid, then the invalid PCR value is not used to generate a VDR value, and, therefore, would be discarded before causing the above mentioned data mismatch.

Accordingly, the validity indication solves the PCR generation problem in the GPU 109 because GPU 109 does not have to calculate the PCR value for every data packet. Rather, the GPU 109 may rely on hardware capture to generate the PCR value instead of doing calculation/prediction upon entering a wake mode from a sleep mode.

In one or more embodiments, the data packet management platform 103 is configured to add a new field header to the data backed named "low jitter PCR," or in other words, a surrogate or estimated PCR value, for the data management platform to insert an estimated PCR value as a placeholder when the GPU 109 does not generate a PCR value.

The value of the low jitter PCR field may be generated remotely by a radio and the radio may implement a phase locked loop (PLL) that locks to the GPU 109's 27 MHz clock. The inclusion of this locked low-jitter PCR field is to guarantee that the clock samples are not be diluted and the clock recovery accuracy remains the same throughout a communication session.

In one or more embodiments, a rule may be defined at a receiver side UE 101 for the MAC to label the "PCR and VDR indication" as invalid when a MAC packet retry bit is set to 1, for example to pre-empt transmission of a data packet carrier. For example, when the PCR value and/or the VDR value are indicated as invalid, this may be considered to indicate or correspond to the packet number and sequence numbers having a mismatch, or predict that a mismatch may occur, at the receiver side UE 101. As such, if the MAC retry bit causes an invalidation of the PCR value and/or the VDR value, then the PCR and/or VDR values are discarded and not communicated so as not to cause a mismatch, which in turn causes jitter.

In the following examples, consider the validity indicator to indicate a valid PCR and/or VDR value for clock recovery when set to 1, and an invalid PCR and/or VDR value when set to 0. When the validity value is set to 0 and indicates the PCR and VDR values are invalid, the data packet management platform accordingly causes the values to be discarded by the originating or receiving UE 101. Additionally, when the data packet management platform 103 and/or the receiver MAC determines that the retry bit in the MAC data frame is set to 1 (i.e. as discussed above), the data packet management platform and/or the MAC layer may cause the PCR/VDR validity value bit to change from 1 to 0 to cause the values to be discarded so as to avoid packet number and sequence number mismatch, for example. While the bit values discussed above are described in binary 1's and 0's, the respective fields and validity/invalidity values may be set to any number, letter, or other indicator that accordingly serves the same or similar purpose.

In one or more embodiments, the system 100 may cause the following scenarios when determining whether to communicate a data packet carrier from an originating UE 101 to a receiving UE 101.

The data packet carrier may be generated by the data packet management platform 103 such that the data packet carrier has a program number value, a sequence number value, an optional PCR value (i.e. optional depending on whether the GPU 109 was in a wake mode an generated a PCR value), a surrogate PCR value (e.g. a low jitter PCR value generated by estimate or radio on hardware capture), a VDR value (based on, either the PCR value if there is one or the surrogate PCR value) and a validity indicator.

The data packet management platform 103 processes the data packet carrier to determine whether the data packet carrier comprises the optional PCR value, and if the data packet carrier does not have the optional PCR value, the data packet management platform causes, at least in part, a surrogate PCR (e.g. low jitter PCR) value to be generated by either the GPU 109 or another source by way of a radio communication.

According to various embodiments, the validity indicator may indicate that the optional PCR value or the surrogate PCR value, depending which ends up in the data packet carrier, and/or the VDR value is valid or invalid. If the validity indication is valid, the data packet management platform 103 determines whether a media access control retry bit value indicates one of the optional PCR value and the surrogate PCR value, and/or the VDR value is invalid. If the media access control retry bit value indicates that the optional PCR value, surrogate PCR value, and/or VDR value is invalid, the data packet management platform 103 causes, at least in part, the value of the validity indicator to change to indicate one of the optional PCR value and the surrogate PCR, and/or the VDR value is invalid. Alternatively, the value of the validity indicator may be caused to change by a media access control layer. Then, because the PCR/VDR validity value is invalid, the data packet management platform 103 causes the PCR/VDR values to be discarded.

Alternatively, if the media access control retry bit value indicates one of the optional PCR value and the surrogate PCR value and/or the VDR value is valid, and if the value of the validity indicator indicates one of the optional PCR value and the surrogate PCR value is invalid, the data packet management platform 103 causes, at least in part, one of the optional PCR value and the surrogate PCR value, and/or the VDR value to be discarded based, at least in part, on the value of the validity indicator.

According to another scenario, if the media access control retry bit value indicates one of the optional PCR value and the surrogate PCR value, and/or the VDR value is invalid, then the data packet management platform 103 causes, at least in part, one of the optional PCR value and the surrogate PCR value, and/or the VDR value to be discarded based, at least in part, on the value of the media access control bit.

But, for example, if the media access control retry bit value indicates one of the optional PCR value and the surrogate PCR value, and/or the VDR value is valid, and the value of the validity indicator indicates one of the optional PCR value and the surrogate PCR value, and/or the VDR value is valid, then the data packet management platform 103 may cause, at least in part, the data packet carrier to be communicated from an originating UE 101 to a receiving UE 101 based, at least in part, on the media access control retry bit value and the value of the validity indicator because no data mismatch is likely.

According to various embodiments, and by way of example, the communication network 105 of system 100 includes one or more networks such as a wired data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), WiGig, wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101, other UE 101's, and data packet management platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
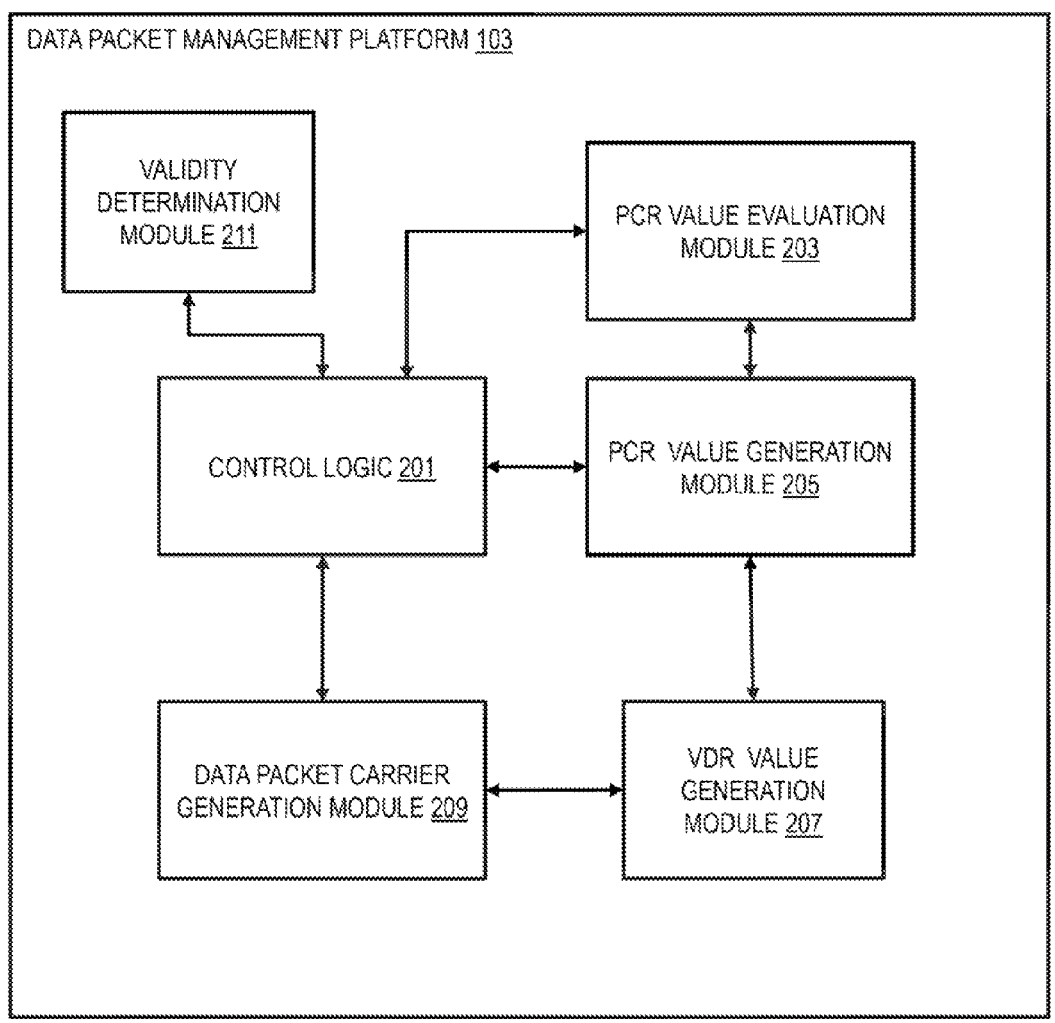
FIG. 2 is a diagram of the components of a data packet management platform, according to one embodiment.

FIG. 2 is a diagram of the components of the data packet management platform 103, according to one embodiment. By way of example, the data packet management platform 103 includes one or more components for determining a PCR value validity, for avoiding inaccurate VDR values, and for avoiding a mismatch in a data packet between a sequence number and a packet number for a wireless display extension. It is contemplated that the functions of these components may be combined in one or more components or performed by other components of equivalent functionality. In this embodiment, the data packet management platform 103 includes a control logic 201, a PCR value evaluation module 203, a PCR value generation module 205, a VDR generation module 207, a data packet carrier generation module 209, and a validity determination module 211.

In one or more embodiments, the control logic 201 determines to cause the data packet carrier generation module 209 to generate a data packet carrier such that the data packet carrier has a program number value, a sequence number value, an optional PCR value (i.e. optional depending on whether the GPU 109 was in a wake mode an generated a PCR value), a surrogate PCR value (e.g. a low-jitter PCR value generated by estimate or radio on hardware capture), a VDR value (based on, either the PCR value if there is one or the surrogate PCR value) and a validity indicator. When generating the data packet carrier, the control logic 201 causes the PCR evaluation module 203 to determine if the GPU 109 provided a PCR value for the data packet carrier and accordingly to determine if the data packet carrier comprises the optional PCR value. If the data packet carrier does not have the optional PCR value from the GPU 109, the control logic 201 causes the PCR value generation module 205 to cause a surrogate PCR (e.g. low jitter PCR) value to be generated by either the GPU 109 or another source by way of a radio communication.

The control logic 201 may then, upon generation of the surrogate PCR value, causes the VDR value generation module 207 to generate a VDR value based on the surrogate PCR value if necessary. Then, the data packet carrier generation module 209 may then finalize the data packet carrier having a program number value, a sequence number value, an optional PCR value (i.e. optional depending on whether the GPU 109 was in a wake mode an generated a PCR value), a surrogate PCR value (e.g. a low-jitter PCR value generated by estimate or radio on hardware capture), a VDR value (based on, either the PCR value if there is one or the surrogate PCR value) and a validity indicator.

According to various embodiments, the control logic 201, upon receiving at least one of an indication that the data packet carrier has been finalized by the data packet carrier generation module 209 or the data packet carrier itself instructs the validity determination module 211 to evaluate the data packet carrier to determine whether the PCR value generated by the GPU 109, the surrogate PCR value, and/or the VDR value are valid based on the validity indicator. If the validity indicator indicates the PCR/VDR values are valid, the validity determination module 211 determines if the MAC retry bit indicates whether the PCR/VDR values are valid. Then, depending on the outcome of the determinations made by the validity determination module 211, if any of the validity value or the MAC retry bit indicate invalidity, the validity determination module 211 instructs the control logic to discard the PCR/VDR values. For example, if the PCR/VDR validity value indicates invalid, the data packet management platform 103 causes the PCR/VDR values to be discarded, and if the validity indicator indicates the PCR/VDR values are valid, but the MAC retry bit is determined to indicate invalidity, the validity determination module 211 instructs the control logic 201 to instruct the data packet carrier generation module 209 to modify the validity value so that it indicates that the PCR/VDR values are invalid. Once modified, the data packet carrier having the modified invalid validity value is communicated to the validity determination module 211. Upon evaluating the modified data packet carrier having the invalid validity indication, the validity determination module 211 instructs the control logic 201 to discard the PCR/VDR values.

Alternatively, upon determining that the MAC retry bit indicates that the PCR/VDR values are invalid, the validity determination module 211 may instruct the control logic 201 to discard the PCR/VDR values.

But, for example, if validity determination module 211 determines the media access control retry bit value indicates the PCR/VDR values are valid, and determines the value of the validity indicator indicates the PCR/VDR value are valid, then the validity determination module 211 instructs the control logic 201 to cause the data packet carrier to be communicated from an originating UE 101 to a receiving UE 101.

Figure 3:
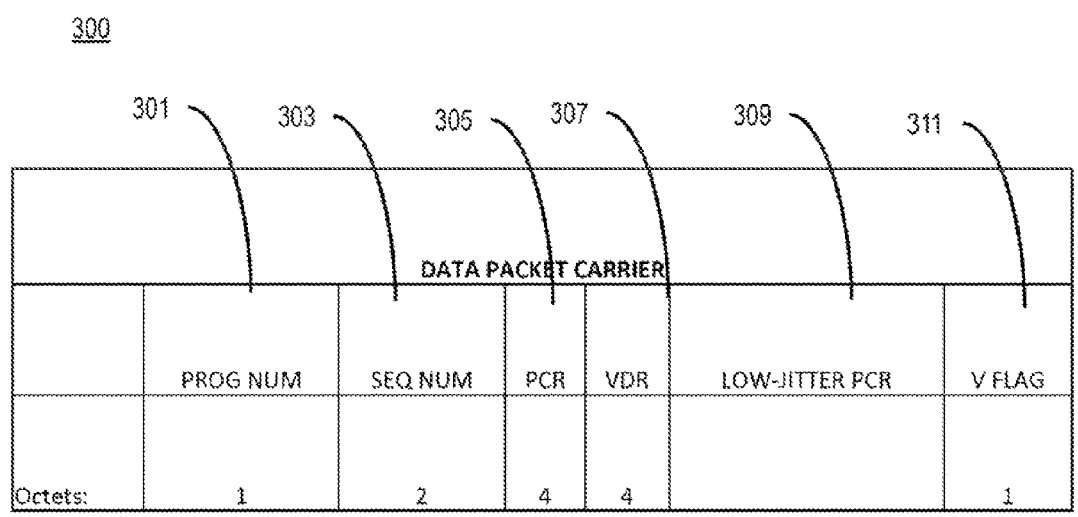
FIG. 3 is a diagram of a data packet carries, according to one embodiment.

FIG. 3 is an illustration of a data packet carrier 300 having a program number field 301 having a program number value, a sequence number field 303 having a sequence number value, a PCR value field 305 having a PCR value generated by a GPU 109, a VDR value field 307 having a VDR value that is based on the PCR value. The VDR value, as discussed above may be determined at the MAC/PHY layer or by the data packet management platform 103, a low jitter PCR value field 309 that does not have a low-jitter PCR value because the PCR value was generated by the GPU 109. But, if the GPU 109 did not generate a PCR value, then the PCR value field 305 would be vacant and the low jitter PCR value field 309 would be populated. The data packet carrier 300 also has a validity flag field 311 that indicates the validity of at least one of the PCR values in the PCR value field 305 or the low-jitter PCR value field 309 and the VDR value. Since the VDR value is based on the PCR value, it too may be considered valid or invalid based on the same criteria as the PCR value.

Figure 4:
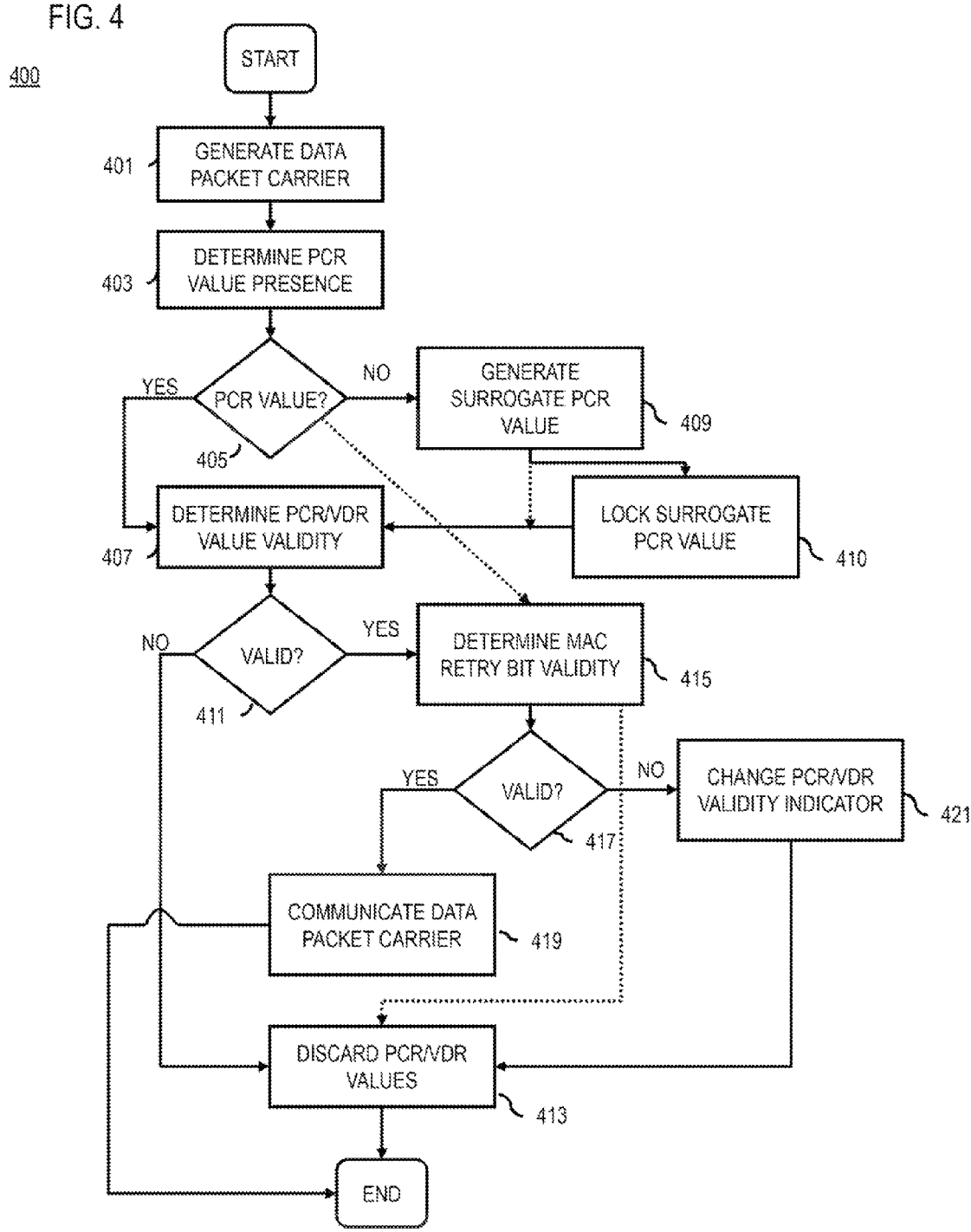
FIG. 4 is a flowchart of a process for determining a PCR value validity, for avoiding inaccurate VDR values, and for avoiding a mismatch in a data packet between a sequence number and a packet number for a wireless display extension, according to one embodiment.
Figure 5:
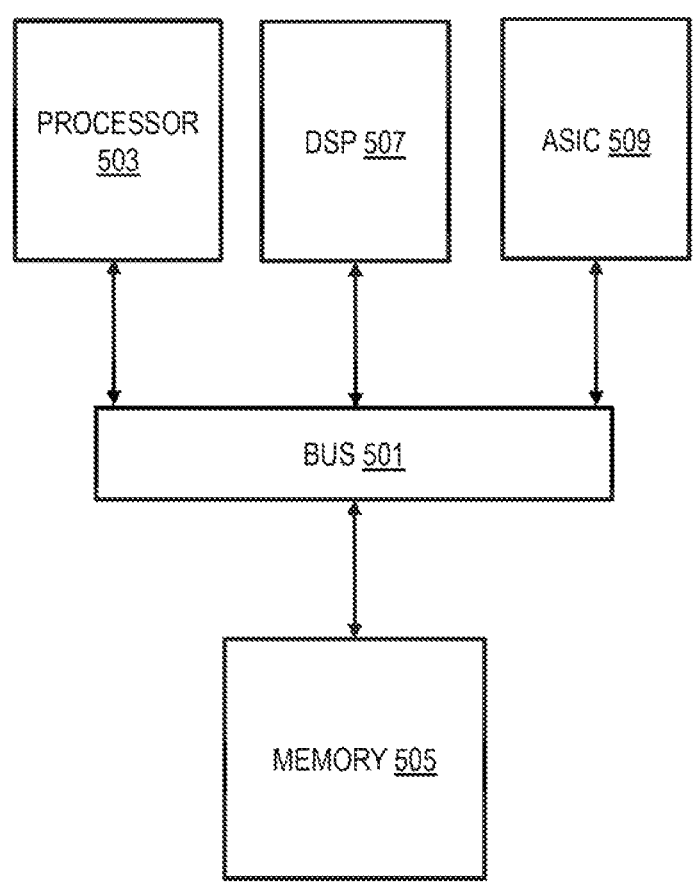
FIG. 5 is a diagram of a chip set that can be used to implement an embodiment.

FIG. 4 is a flowchart of a process for determining a PCR value validity, for avoiding inaccurate VDR values, and for avoiding a mismatch in a data packet between a sequence number and a packet number for a wireless display extension, according to one embodiment. In one embodiment, the data packet management platform 103 performs the process 400 and is implemented in, for instance, a chip set including a processor and a memory as shown in FIG. 5. In step 401, the data packet management platform determines to generate a data packet carrier comprising an optional PCR value, a VDR value, and a validity indicator. The optional PCR value may, for example, be generated by the GPU 109. The VDR value, for example, may be generated at a MAC/PHY layer based on the PCR value if the PCR value is generated. The process continues to step 403 in which the data packet management platform 103 determines whether the data packet carrier comprises the optional PCR value. A decision is made at step 405. If the data packet management platform determines the PCR value is present, then the process continues to step 407 in which the data packet management platform 103 will determine the validity of the PCR value and the VDR value that corresponds to the PCR value provided in the data packet carrier. If the PCR value is not present, the data packet management platform 103 will cause a surrogate PCR value (e.g. a low-jitter PCR value) to be generated in step 409. The process optionally continues to step 410 in which the data packet management platform 103 causes the surrogate PCR value to be locked to a clock of the GPU 109 with a phase-locked loop. Alternatively, the process may continue directly to step 407. When the surrogate PCR value is generated and optionally locked, a corresponding VDR value may also be generated based on the surrogate PCR value. The process again continues to step 407 from step 409 to determine whether the PCR/VDR values are valid. A decision is made at step 411. If the data packet management platform determines that the PCR/VDR values are invalid, then the process continues to step 413 at which point the data packet management platform 103 causes the PCR/VDR values to be dropped.

If the decision at step 411 is yes, then the process continues to step 415 in which the data packet management platform 103 determines if a MAC retry bit indicates PCR/VDR validity. A decision is made at step 417. If the MAC retry bit is determined to indicate validity, then the data packet management platform 103 causes the data packet carrier to be communicated in step 419. If, however, the MAC retry bit is determined to indicate invalidity, then the process continues to step 421 in which the data packet management platform 103 causes the validity indicator for the PCR/VDR values to change to an invalid indicator. Because the PCR/VDR values are now indicated as being invalid, the data packet management platform 103 causes the PCR/VDR values to be discarded.

Alternatively, the data packet management platform 103 may be configured to determine whether the MAC retry bit indicates whether the PCR/VDR values are valid at step 415 immediately following the decision at step 405, for example, or at the generation point of the data packet carrier at step 401, for example. The data packet management platform 103, therefore, may be configured to reject the PCR/VDR values, if any, or circumvent the processes discussed above if it determines the MAC retry bit indicates the PCR/VDR values are invalid, and causes the PCR/VDR values to be discarded at step 413 based, at least in part, on the MAC retry bit indicating that the PCR/VDR values are invalid.

The processes described herein for determining a PCR value validity, for avoiding inaccurate VDR values, and for avoiding a mismatch in a data packet between a sequence number and a packet number for a wireless display extension may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

FIG. 5 illustrates a chip set or chip 500 upon which an embodiment may be implemented. Chip set 500 is programmed to determine a PCR value validity, for avoiding inaccurate VDR values, and for avoiding a mismatch in a data packet between a sequence number and a packet number for a wireless display extension as described herein may include, for example, bus 501, processor 503, memory 505, DSP 507 and ASIC 509 components.

The processor 503 and memory 505 may be incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 500 can be implemented in a single chip. It is further contemplated that in certain embodiments the chip set or chip 500 can be implemented as a single "system on a chip." It is further contemplated that in certain embodiments a separate ASIC would not be used, for example, and that all relevant functions as disclosed herein would be performed by a processor or processors. Chip set or chip 500, or a portion thereof, constitutes a means for performing one or more steps of determining a PCR value validity, for avoiding inaccurate VDR values, and for avoiding a mismatch in a data packet between a sequence number and a packet number for a wireless display extension.

In one or more embodiments, the chip set or chip 500 includes a communication mechanism such as bus 501 for passing information among the components of the chip set 500. Processor 503 has connectivity to the bus 501 to execute instructions and process information stored in, for example, a memory 505. The processor 503 may include one or more processing cores with each core configured to perform independently. A multi-core processor enables multiprocessing within a single physical package. Examples of a multi-core processor include two, four, eight, or greater numbers of processing cores. Alternatively or in addition, the processor 503 may include one or more microprocessors configured in tandem via the bus 501 to enable independent execution of instructions, pipelining, and multithreading. The processor 503 may also be accompanied with one or more specialized components to perform certain processing functions and tasks such as one or more digital signal processors (DSP) 507, or one or more application-specific integrated circuits (ASIC) 509. A DSP 507 typically is configured to process real-world signals (e.g., sound) in real time independently of the processor 503. Similarly, an ASIC 509 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one or more embodiments, the processor (or multiple processors) 503 performs a set of operations on information as specified by computer program code related to determining a PCR value validity, for avoiding inaccurate VDR values, and for avoiding a mismatch in a data packet between a sequence number and a packet number for a wireless display extension. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 501 and placing information on the bus 501. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 503, such as a sequence of operation codes, constitute processor instructions, also called computer system instructions or, simply, computer instructions. Processors may be implemented as mechanical, electrical, magnetic, optical, chemical or quantum components, among others, alone or in combination.

The processor 503 and accompanying components have connectivity to the memory 505 via the bus 501. The memory 505 may include one or more of dynamic memory (e.g., RAM, magnetic disk, writable optical disk, etc.) and static memory (e.g., ROM, CD-ROM, etc.) for storing executable instructions that when executed perform the inventive steps described herein to determine a PCR value validity, for avoiding inaccurate VDR values, and for avoiding a mismatch in a data packet between a sequence number and a packet number for a wireless display extension. The memory 505 also stores the data associated with or generated by the execution of the inventive steps.

In one or more embodiments, the memory 505, such as a random access memory (RAM) or any other dynamic storage device, stores information including processor instructions for determining a PCR value validity, for avoiding inaccurate VDR values, and for avoiding a mismatch in a data packet between a sequence number and a packet number for a wireless display extension. Dynamic memory allows information stored therein to be changed by system 100. RAM allows a unit of information stored at a location called a memory address to be stored and retrieved independently of information at neighboring addresses. The memory 505 is also used by the processor 503 to store temporary values during execution of processor instructions. The memory 505 may also be a read only memory (ROM) or any other static storage device coupled to the bus 501 for storing static information, including instructions, that is not changed by the system 100. Some memory is composed of volatile storage that loses the information stored thereon when power is lost. The memory 505 may also be a non-volatile (persistent) storage device, such as a magnetic disk, optical disk or flash card, for storing information, including instructions, that persists even when the system 100 is turned off or otherwise loses power.

The term "computer-readable medium" as used herein refers to any medium that participates in providing information to processor 503, including instructions for execution. Such a medium may take many forms, including, but not limited to computer-readable storage medium (e.g., non-volatile media, volatile media), and transmission media. Non-volatile media includes, for example, optical or magnetic disks. Volatile media include, for example, dynamic memory. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

While a number of embodiments and implementations have been described, the invention is not so limited but covers various obvious modifications and equivalent arrangements, which fall within the purview of the appended claims. Although features of various embodiments are expressed in certain combinations among the claims, it is contemplated that these features can be arranged in any combination and order.

What is claimed is:
1. A method comprising:
   generating with a processor a data packet carrier comprising an optional program clock reference (PCR) value, a variable delay reference (VDR) value, and a validity indicator;
   processing with the processor the data packet carrier to determine whether the data packet carrier comprises the optional PCR value;
   in response to the data packet carrier not comprising the optional PCR value then generating a surrogate PCR value;
   determining with the processor if a media access control retry bit value indicates one of the optional PCR value and the surrogate PCR value is valid;

in response to a validity indication then causing, at least in part, the data packet carrier to be communicated based, at least in part, on the media access control retry bit value;

in response to an invalidity indication then causing, at least in part, one of the optional PCR value and the surrogate PCR value to be discarded;

wherein the surrogate PCR value is generated remotely by a graphics processing unit.

2. A method of claim 1, further comprising: determining a value of the validity indicator indicates one of the optional PCR value and the surrogate PCR value is valid; causing, at least in part, the value of the validity indicator to change to indicate one of the optional PCR value and the surrogate PCR value is invalid; and causing, at least in part, one of the optional PCR value and the surrogate PCR value to be discarded based, at least in part, on the changed value of the validity indicator.

3. A method of claim 2, wherein the value of the validity indicator is caused to change by a media access control layer.

4. A method of claim 1, further comprising: determining a media access control retry bit value indicates one of the optional PCR value and the surrogate PCR value is invalid; causing, at least in part, one of the optional PCR value and the surrogate PCR value to be discarded based, at least in part, on the value of at least the media access control retry bit value.

5. A method of claim 1, further comprising: determining a value of the validity indicator indicates one of the optional PCR value and the surrogate PCR value is valid.

6. A method of claim 1, wherein the VDR value is based, at least in part, on one of the optional PCR value and the surrogate PCR value.

7. A method of claim 1, further comprising: causing, at least in part, a phase-locked loop to lock the surrogate PCR value to a clock of the graphics processing unit.

8. An apparatus comprising:
at least one processor; and
at least one memory including computer program code for one or more programs, the at least one memory and the computer program code configured to, with the at least one processor, cause the apparatus to perform at least the following:
generating with the at least one processor a data packet carrier comprising an optional program clock reference (PCR) value, a variable delay reference (VDR) value, and a validity indicator;
process with the at least one processor the data packet carrier to determine whether the data packet carrier comprises the optional PCR value;
in response to the data packet carrier not comprising the optional PCR value then generating a surrogate PCR value;
determine with the at least one processor if a media access control retry bit value indicates one of the optional PCR value and a surrogate PCR value is valid;
in response to a validity indication then cause, at least in part, the data packet carrier to be communicated based, at least in part, on the media access control retry bit value;
in response to an invalidity indication then causing, at least in part, one of the optional PCR value and the surrogate PCR value to be discarded;
cause, at least in part, a phase-locked loop to lock the surrogate PCR value to a clock of a graphics processing unit.

9. An apparatus of claim 8, wherein the apparatus is further caused to: cause, at least in part, the surrogate PCR value to be generated based, at least in part, on a determined absence of the optional PCR value from the data packet carrier.

10. An apparatus of claim 9, wherein the apparatus is further caused to: determine a value of the validity indicator indicates one of the optional PCR value and the surrogate PCR value is invalid; and cause, at least in part, one of the optional PCR value and the surrogate PCR value to be discarded based, at least in part, on the value of the validity indicator.

11. An apparatus of claim 9, wherein the apparatus is further caused to: determine a media access control retry bit value indicates one of the optional PCR value and the surrogate PCR value is invalid; cause, at least in part, one of the optional PCR value and the surrogate PCR value to be discarded based, at least in part, on the value of at least the media access control retry bit value.

12. An apparatus of claim 9, wherein the apparatus is further caused to: determine a media access control retry bit value indicates one of the optional PCR value and the surrogate PCR value is valid; determine a value of the validity indicator indicates one of the optional PCR value and the surrogate PCR value is valid.

13. An apparatus of claim 9, wherein the VDR value is based, at least in part, on one of the optional PCR value and the surrogate PCR value.

14. A computer-readable storage medium carrying one or more sequences of one or more instructions which, when executed by one or more processors, cause an apparatus to at least perform the following:
determine to generate a data packet carrier comprising an optional program clock reference (PCR) value, a variable delay reference (VDR) value, and a validity indicator;
process the data packet carrier to determine whether the data packet carrier comprises the optional PCR value;
in response to the data packet carrier not comprising the optional PCR value then generating a surrogate PCR value;
determine if a media access control retry bit value indicates one of the optional PCR value and a surrogate PCR value is valid;
in response to a validity indication then causing, at least in part, the data packet carrier to be communicated based, at least in part, on the media access control retry bit value;
in response to an invalidity indication then causing, at least in part, one of the optional PCR value and the surrogate PCR value to be discarded;
wherein the surrogate PCR value is generated remotely by a graphics processing unit.

15. A computer-readable storage medium of claim 14, wherein the apparatus is caused to:
determining a value of the validity indicator indicates one of the optional PCR value and the surrogate PCR value is valid; causing, at least in part, the value of the validity indicator to change to indicate one of the optional PCR value and the surrogate PCR value is invalid; and causing, at least in part, one of the optional PCR value and the surrogate PCR value to be discarded based, at least in part, on the changed value of the validity indicator;

causing, at least in part, a phase-locked loop to lock the surrogate PCR value to a clock of the graphics processing unit.

\* \* \* \* \*